US 6,604,654 B2

United States Patent
Staten et al.

(10) Patent No.: US 6,604,654 B2
(45) Date of Patent: Aug. 12, 2003

(54) THREE-BARREL FROZEN PRODUCT DISPENSER

(75) Inventors: Richard Carroll Staten, Atlanta, GA (US); Douglas John Franck, Marietta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/780,772

(22) Filed: Feb. 9, 2001

(65) Prior Publication Data

US 2002/0108964 A1 Aug. 15, 2002

Related U.S. Application Data

(60) Provisional application No. 60/242,370, filed on Oct. 20, 2000.

(51) Int. Cl.[7] .................................................. B67D 5/60
(52) U.S. Cl. ........................ 222/1; 222/61; 222/145.5; 222/146.6; 222/386.5
(58) Field of Search ...................... 222/1, 61, 145.5, 222/146.6, 386.5; 62/342

(56) References Cited

U.S. PATENT DOCUMENTS

| | | | | |
|---|---|---|---|---|
| 2,239,165 A | | 4/1941 | Adams .............................. 107/4 |
| 2,408,704 A | | 10/1946 | Taylor ............................. 62/89 |
| 3,052,381 A | | 9/1962 | Carpigiani .................... 222/132 |
| 3,276,633 A | | 10/1966 | Rahauser .................... 222/129.1 |
| 3,323,321 A | | 6/1967 | Carpigiani .................... 62/342 |
| 3,719,056 A | | 3/1973 | Hock et al. .................... 62/70 |
| 4,332,145 A | * | 6/1982 | Yuhasz et al. ................ 62/342 |
| 4,625,525 A | * | 12/1986 | Bradbury et al. .............. 62/342 |
| 4,643,335 A | | 2/1987 | Carnisio ....................... 222/135 |
| 4,707,997 A | | 11/1987 | Bigler et al. ................... 62/341 |
| 4,869,072 A | | 9/1989 | Sexton et al. ................... 62/136 |
| 4,900,158 A | | 2/1990 | Ugolini ....................... 366/143 |
| 5,159,818 A | | 11/1992 | Etou et al. ..................... 62/137 |
| 5,244,277 A | | 9/1993 | Broussalian et al. ......... 374/141 |
| 5,417,355 A | | 5/1995 | Broussalian et al. ...... 222/146.6 |
| 5,584,327 A | * | 12/1996 | Thomas et al. ........... 222/145.5 |
| 5,588,558 A | * | 12/1996 | Cox et al. ................. 222/146.6 |
| 5,642,761 A | | 7/1997 | Holbrook ..................... 141/104 |
| 5,735,602 A | | 4/1998 | Salvatore .................... 366/314 |
| 5,743,097 A | | 4/1998 | Frank ............................ 62/68 |
| 5,906,105 A | | 5/1999 | Ugolini ......................... 62/136 |
| 5,931,343 A | | 8/1999 | Topar et al. ................... 222/56 |
| 5,957,040 A | | 9/1999 | Feola .......................... 99/450.6 |
| 6,045,007 A | * | 4/2000 | Simmons ................. 222/146.6 |
| 6,058,721 A | | 5/2000 | Midden et al. ................. 62/136 |
| 6,220,047 B1 | * | 4/2001 | Vogel et al. ................... 62/342 |

FOREIGN PATENT DOCUMENTS

| | | |
|---|---|---|
| JP | 01-043154 | 2/1989 |
| JP | 64-43154 | 2/1989 |
| JP | 10-136903 | 5/1998 |
| TW | 825521 | 7/1997 |

\* cited by examiner

*Primary Examiner*—Joseph A. Kaufman
(74) *Attorney, Agent, or Firm*—Sutherland Asbill & Brennan LLP

(57) ABSTRACT

A dispenser for providing a number of frozen products. The dispenser includes a refrigeration system and a product delivery system. The refrigeration system includes a compressor and the product delivery system includes three product barrels. The dispenser thus may provide three frozen products and up to two blends of the products. The dispenser also may have a frame. The frame may have a width of about seventeen (17) to about twenty-four (25) inches and a length of about twenty-four (24) to about forty (40) inches.

20 Claims, 3 Drawing Sheets

THREE-BARREL FROZEN PRODUCT DISPENSER

This application claims the benefit of provisional application 60/242,370 filed Oct. 20, 2000.

TECHNICAL FIELD

The present invention relates generally to a beverage dispenser and more particularly relates to a frozen product dispenser with three product barrels and one compressor.

BACKGROUND OF THE INVENTION

Known frozen product dispensers generally come in a two barrel format or a four-barrel format. By "barrel", we mean a mixing chamber for a type, flavor, or brand of a beverage, confection, or other type of product. The two-barrel device can thus produce two brands of the frozen products and a blend of the two brands. The four-barrel device can produce four brands and several blends. The four-barrel device is generally a duplication of the two-barrel device in that the four-barrel device may have twice as many parts and may have almost twice the dimensions as the two-barrel device.

For example, a conventional two-barrel device may have a width of about seventeen (17) to twenty-five (25) inches and a length of about twenty-four (24) to forty (40) inches. A conventional four-barrel device may be about twice as large. Significantly, the four-barrel device also uses two compressors as opposed to one compressor in the standard two-barrel device. As such, although the four-barrel device is more versatile in product selection, it takes up almost twice as much counter space as the two-barrel device and may require almost twice as much power and maintenance.

In many commercial outlets, however, there is an ever increasing demand for viable counter space. Although a proprietor may desire to dispense more than two brands and one blend of the frozen products, the proprietor may not be willing to forego valuable counter space for the extra versatility of the larger product dispenser. Further, the proprietor may not be interested in the additional cost, noise, and maintenance generally required for a four-barrel device having two compressors.

There is a need, therefore, for a device that offers more flexibility and brands than known two-barrel frozen product dispensers. Such a dispenser should provide more brands and blends than known two-barrel devices without taking up anymore counter space, generating anymore noise, using anymore power, or requiring anymore maintenance. Further, the device preferably should be easy to use and reasonably priced.

SUMMARY OF THE INVENTION

The present invention thus provides a dispenser for providing a number of frozen products. The dispenser includes a refrigeration system and a product delivery system. The refrigeration system includes a compressor and the product delivery system includes three pressurized product barrels. The dispenser thus may provide three frozen products and up to two blends of the products.

Specific embodiments include the use of a frame. The frame may have a width of about seventeen (17) to about twenty-five (25) inches and a length of about twenty-four (24) to about forty (40) inches. The dispenser may provide a number of frozen carbonated beverages, a number of frozen noncarbonated beverages, or a number of partially frozen products.

A number of product sources may be used. The product sources may be communication with the three pressurized product barrels via a number of product pumps. A water source may be used. The water source may be in communication with the three pressurized product barrels via a water pump. A gas source also may be used. The gas source may be in communication with the three pressurized product barrels via a regulator. The product delivery system also may include a number of expansion chambers in communication with the three pressurized product barrels so as to accept product from the product sources, water from the water source, and gas from the gas source. Each of the three pressurized product barrels may include a scrapper blade positioned for rotation therein. The product delivery system also may include a nozzle in communication with the three pressurized product barrels.

The refrigeration system may include a number of evaporators in communication with the compressor. The evaporators may include a number of evaporator lines encircling the three pressurized product barrels. The evaporator lines may encircle the three pressurized product barrels via a shrink fit. The compressor may include about 150 to 250 duty cycles per day. A control circuit may be used in the operation of the product delivery system and the refrigeration system.

A further embodiment of the present invention may provide a dispenser for a providing a number of frozen products from a number of product sources with product therein. The dispenser may include three product barrels in communication with the product sources. The dispenser also may include one compressor and a number of refrigerant lines in communication with the compressor. The refrigerant lines may encircle the three product barrels so as to freeze the product therein.

The method of the present invention may provide a number of frozen beverages. The method includes the step of providing three product sources, providing a water source, mixing the three products and the water to form three beverages, delivering the three beverages to three product barrels, freezing the three beverages within the three product barrels by operating one compressor, and dispensing three frozen beverages and up to two blends of the beverages. The method may further include the steps of providing a gas source and mixing the three products, the water, and the gas. The frozen beverages may include carbonated and noncarbonated beverages.

Other objects, features, and advantages of the present invention will become apparent upon review of the following detailed description of the various embodiments of the invention when taken in conjunction with the drawings and the appended claims.

DETAILED DESCRIPTION OF THE INVENTION

Figure 1:
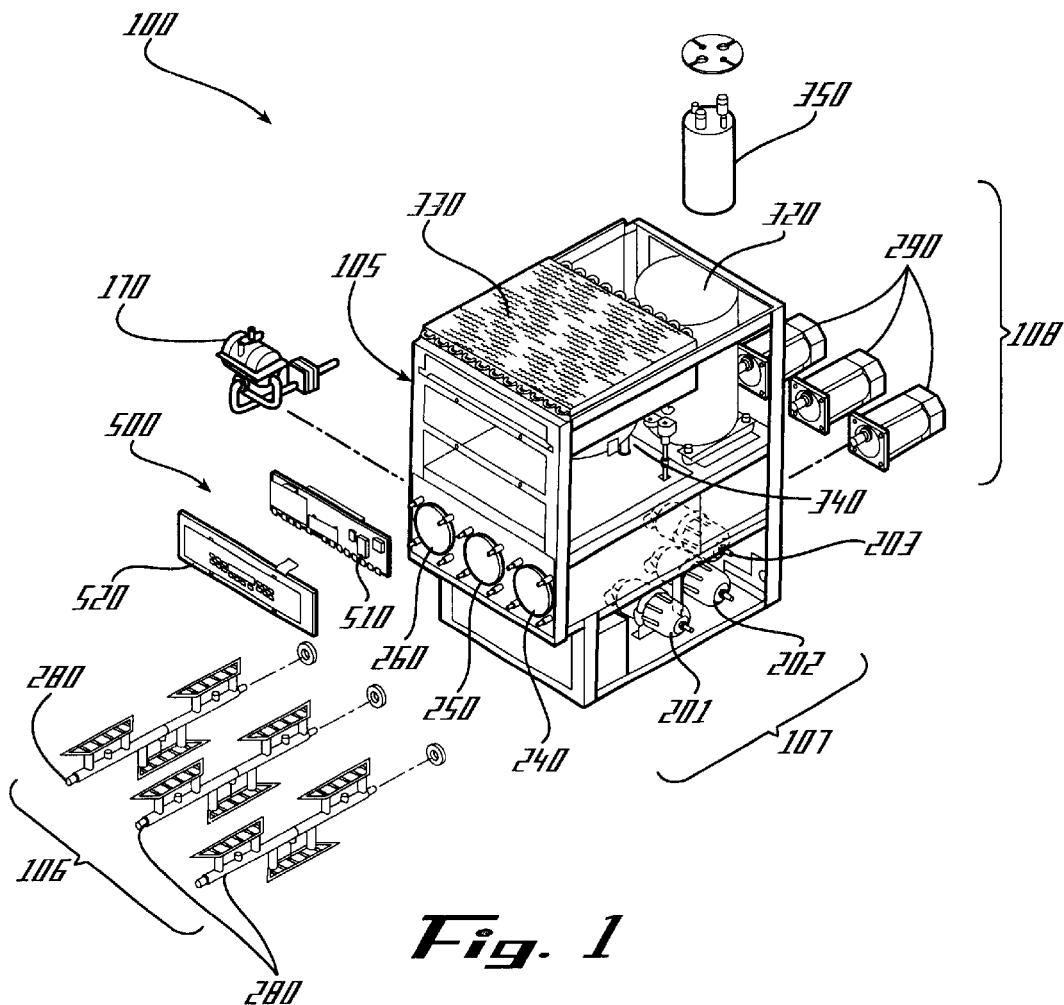
FIG. 1 is a partially exploded view of the component of the three-barrel frozen product dispenser of the present invention.
Figure 2:
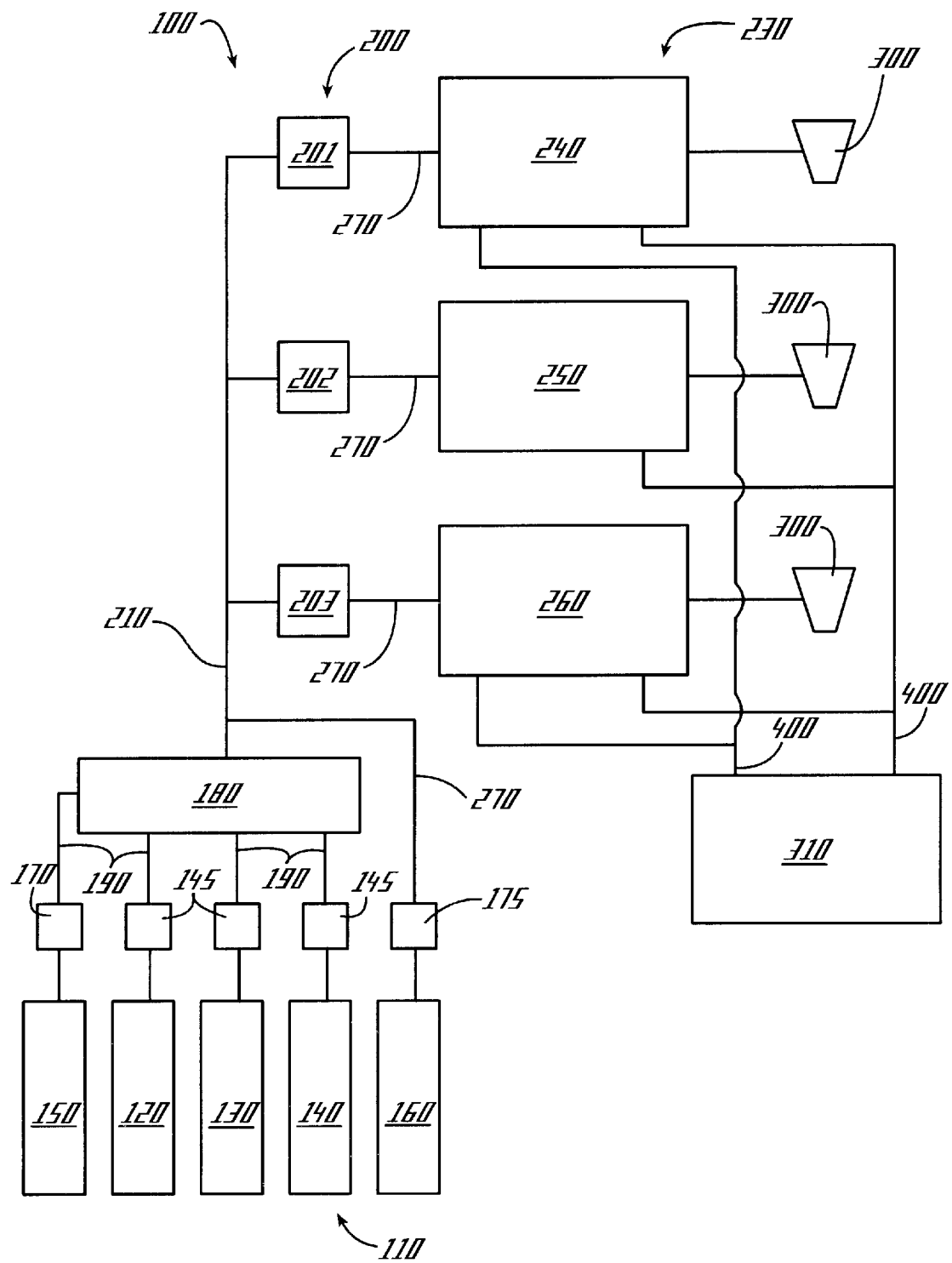
FIG. 2 is a schematic diagram of the basic components of the frozen product dispenser of FIG. 1.

Referring now to the drawings, in which like numerals refer to like elements throughout the several views, FIGS. 1 through 3 show a frozen product dispenser 100 of the present invention. Although the frozen product dispenser 100 as described herein is used in the context of a frozen carbonated product such as a carbonated soft drink or the like, it is understood that the invention is equally applicable to any type of frozen or partially frozen dispensable product or confection such as noncarbonated beverages, ice creams, yogurts, coffee drinks, and the like.

The frozen product dispenser 100 may include a frame 105. The frame 105 preferably has a footprint similar to that of a conventional two-barrel frozen carbonated product dispenser. Specifically, the frame 105 may have a width 106 of about seventeen (17) to about twenty-five (25) inches and a length 107 of about twenty-four (24) to about forty (40) inches. The frame 105 may have a height 108 that is somewhat taller than the conventional two-barrel device. Specifically, the height 108 of the frame 105 may be about twenty-four (24) to about forty-eight (48) inches. This additional height 108 is generally permitted in that the height dimension does not take up any further counter space. The frame 105 may be made out of conventional materials such as stainless steel, aluminum, tube steel, or similar materials.

The product dispenser 100 may include a number of product sources 110. Specifically, the product sources 110 may include a first concentrate source 120, a second concentrate source 130, and a third concentrate source 140. By the term "concentrate", we mean a conventional product syrup, concentrate, or similar types of beverage or confection sources or flavors. Each concentrate source 120, 130, 140 may provide a different type, flavor, or brand of a product or a beverage flavoring, i.e., a cherry flavoring or the like. As described above, the product and the product source 110 may be carbonated or noncarbonated. The concentrate sources 120, 130, 140 may be housed in any type of conventional storage structure such as a syrup tank, a bag in box, a figal, or similar types of containers. The concentrate sources 120, 130, 140 each may have a concentrate pump 145. The concentrate pump 145 is generally positioned adjacent to the concentrate sources 120, 130, 140. The concentrate pump 145 may be of conventional design. The concentrate pump 145 and the concentrate sources 120, 130, 140 may be positioned outside of the frame 105 of the product dispenser 100 itself.

The product dispenser 100 also may include a water source 150 and a gas source 160. The water source 150 may be any type of potable water source. The gas source 160 may provide carbon dioxide gas or any type of compressed gas for the carbonated beverages. The gas source 160 may be housed in any type of pressurized gas container. The concentrate sources 120, 130, 140 may share the water source 150 and the gas source 160 or each concentrate source 120, 130, 140 may have a separate water source 150 and a separate gas source 160. Water from the water source 150 may be pumped into the product dispenser 100 via a water pump 170. The water pump 170 may be positioned within the frame 105 of the product dispenser 100. The water pump 170 may be of conventional design. The gas source 160 may have a regulator 175 thereon so as to meter the flow of the gas. The regulator 175 may be of conventional design. The gas source 160 and the regulator 175 may be positioned outside of the frame 105 of the product dispenser 100.

The concentrate sources 120, 130, 140 and the water source 150 may be connected to a flow control device 180 positioned within the frame 105 of the product dispenser 100. The flow control device 180 may contain a number of metering valves, such as volumetric valves or the like, to meter the appropriate amount of concentrate flow from the concentrate sources 120, 130, 140 and the appropriate amount of water flow from the water source 150 so as to mix the desired product. Each of the concentrate sources 120, 130, 140 and the water source 150 may be connected to its own metering valve. The flow control device 180 and the metering valves therein may be of conventional design. The concentrate sources 120, 130, 140 and the water source 150 may be connected to the flow control device 180 by a series of fluid lines 190. The fluid lines 190 may be of conventional design.

The flow control device 180 in turn may be connected to a number of expansion chambers 200. In this case, a first expansion chamber 201, a second expansion chamber 202, and a third expansion chamber 203. The flow control device 180 and the expansion chambers 200 may be connected by a further series of fluid lines 210. These fluid lines 210 may merge with a gas line 220 in communication with the gas source 160 so as to introduce carbon dioxide or other types of carbonated gas into the fluid flow. The fluid and the carbon dioxide gas mix therein so as to form the carbonated beverage. The expansion chambers 200 then serve to reduce or balance the amount of pressure that may be in the fluid flow without the loss of the carbonation. The expansion chambers 200 may be of conventional design. Alternatively, a conventional carbonator tank may be used to mix the fluid flow with the gas flow as is known in the art.

The expansion chambers 200 may be in fluid communication with a number of product barrels 230. The product barrels 230 may include a first barrel 240, a second barrel 250, and a third barrel 260. The expansion chambers 200 and the product barrels 230 are connected by a number of fluid lines 270. The product barrels 230 may be of conventional pressurized design. The product barrels 230 may hold the product therein under pressure as is known by those skilled in the art. Specifically, the incoming fluid is generally pressurized and the product barrels 230 will hold this pressure. The product barrels 230 also may be unpressurized depending upon the product used therein. The product barrels 230 may be metal structures and may be enclosed with foam insulation. As described in more detail below, the product barrels 230 may be encircled by refrigeration lines so as to freeze at least partially the product therein.

Positioned within each of the product barrels 230 may be a number of scraper blades 280. The scrapper blades 280 rotate so as to prevent the product therein from freezing completely. The scraper blades 280 also may scrape the partially frozen product off of the interior surface of the barrels 230. The scraper blades 280 are driven by a number of drive motors 290 for rotation within the product barrels 230. The scraper blades 280 and the drive motors 290 may be of conventional design.

Each product barrel 230 may be in communication with a nozzle 300 such that the frozen product may be served to the consumer. The nozzle 300 may be of conventional design. The nozzle 300 may permit more than one brand of a product to mix with another brand so as to create a blended product.

Figure 3:
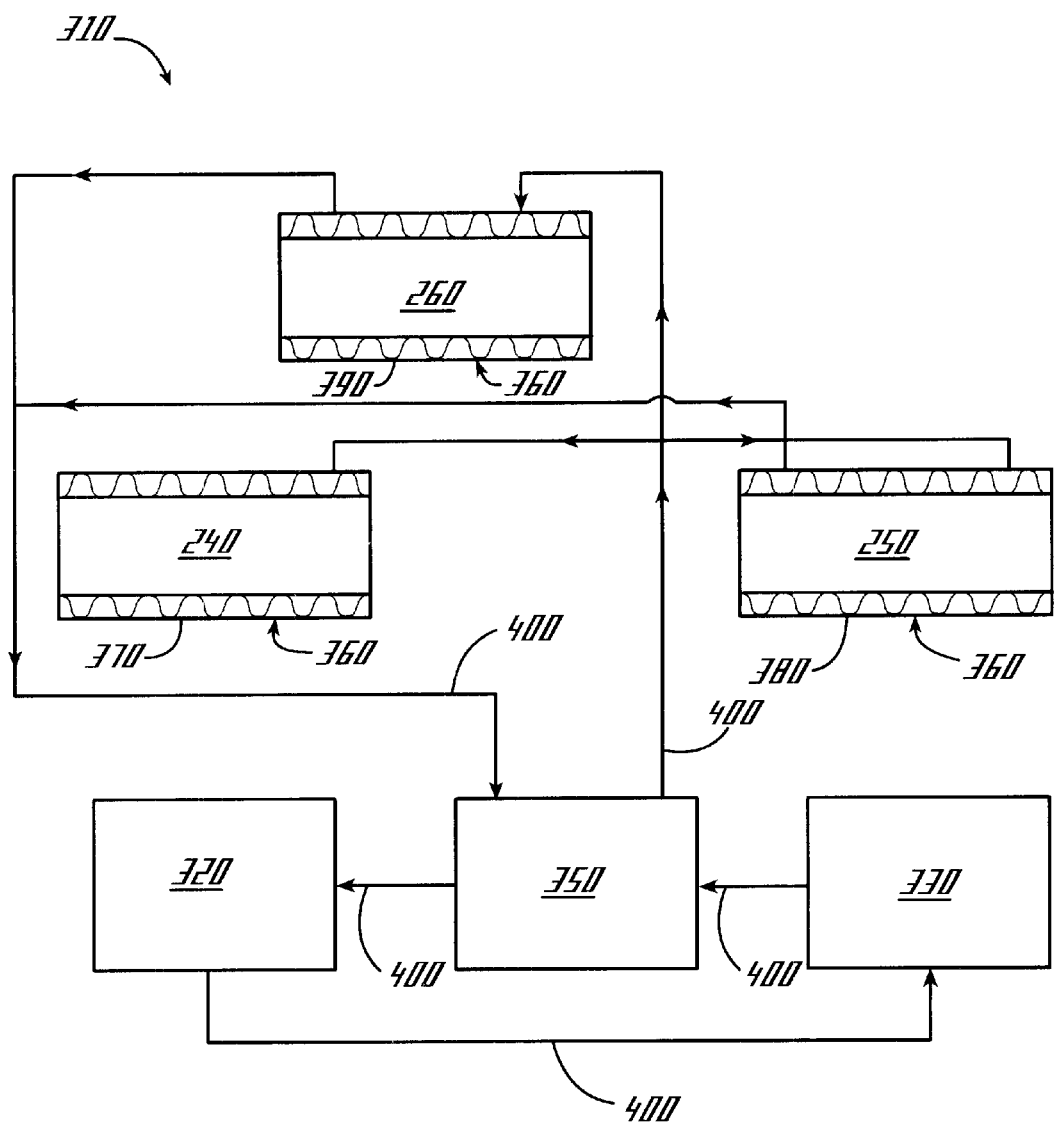
FIG. 3 is a schematic diagram of the refrigeration system of the frozen product dispenser of FIG. 1.

As described above and as is shown in detail in FIG. 3, the product dispenser 100 also includes a refrigeration system 310 so as to freeze at least partially the product therein. The refrigeration system 310 may include a standard compressor 320. The compressor 320 may be of conventional design. For example, the compressor 320 may be a standard two (2) horsepower compressor or the like. The compressor 320 may be in fluid communication with a condenser 330. The condenser 330 may be of conventional design. A fan 340 or another type of an air-moving device may cool the condenser 330 as is known in the art. In turn, the condenser 330 may be in fluid communication with an accumulator 350. The accumulator 350 may be of conventional design.

The accumulator 350 may be in fluid communication with a number of evaporators 360. In this case, a first evaporator 370 is positioned about the first barrel 240, a second evaporator 380 is positioned about the second barrel 250, and a third evaporator 390 is positioned about the third barrel 260. The evaporators 360 preferably may be shrink-fitted on to the outer surface of each of the product barrels 230. The evaporators 360 may be of conventional design. Each of the components of the refrigeration system 310 may be connected by a series of fluid lines 400. The refrigeration system 310 as a whole may use a conventional refrigerant.

A control circuit 500 may control the operation of the product dispenser 100. The control circuit 500 may include one or more control boards 510 and one or more control panels 520. The control boards 510 may be of conventional design and may include a conventional microprocessor so as to control the refrigeration system 310 and the other elements of the product dispenser 100 as a whole. The control circuit 500 is programmed so as to accommodate the use of the three product barrels 230. The control circuit 500 may be programmed in any conventional programming language.

In use, syrup or other types of concentrate or product from the product sources 110 may be pumped via the concentrate pumps 145 to the flow control device 180. Likewise, water from the water source 150 is pumped to the flow control device 180 via the water pump 170. The ingredients are mixed therein and then flow towards the expansion chambers 200. In the process, the fluid is mixed with carbon dioxide or other type of compressed gas from the gas source. The product then flows from the expansion chambers 200 to the barrels 230. The product is then partially frozen therein by the refrigeration system 310 while being mixed and rotated via the scraper blades 280. The frozen product is then served via the nozzle 300.

With respect to the refrigeration system 310, the accumulator 350 delivers refrigerant to the compressor 330 via the fluid lines 400. The compressor 320 delivers the refrigerant to the condenser 330. The condenser 330, in turn, delivers the refrigerant to the accumulator 350. The accumulator 350 then circulates the refrigerant through the various evaporators 360. The refrigerant flows through the fluid lines 400 so as to come into direct contact with the walls of the product barrels 230 for efficient heat transfer therewith. The refrigerant then returns to the accumulator 350 via the fluid lines 400 so as to repeat the process. The refrigeration system 310 may cycle on and off as is appropriate.

The present invention thus provides a frozen product dispenser 100 that can dispense three different flavors, brands, or types and two blends for a total of five different product flavors. The product dispenser 100 of the present invention thus provides these additional flavors in the frame 105 of the same or a similar footprint to that of a conventional two-barrel dispenser. The present invention thus provides greater product versatility in the same sized product dispenser frame.

Further, the present invention also provides these additional flavors with the use of the single compressor 320. The present invention thus results in additional flavors with little additional electrical usage or additional maintenance. In fact, because the duty cycle of the compressor 320 may be somewhat longer given the use of the three product barrels 230, the life of the compressor 320 and the refrigeration system 310 as a whole may be greatly extended in that the number of duty cycles may be reduced. For example, the product dispenser 100 as described herein may serve approximately fourteen (14) to twenty-two (22) gallons of product during a typical day while the compressor 320 may cycle on and off about 150 to 250 times a day. The life of the refrigeration system 310 as a whole should be extended by reducing the number of duty cycles.

It should be apparent that the foregoing description relates only to the preferred embodiments of the present invention and that numerous changes and modifications may be made herein without departing from the spirit and scope of the invention as defined by the following claims.

We claim:

1. A dispenser for a providing a plurality of frozen products, comprising:
    a refrigeration system;
    said refrigeration system comprising a single compressor; and
    a product delivery system;
    said product delivery system comprising three pressurized product barrels chilled by said refrigeration system so as to provide on demand three frozen products and up to two blends of said products.

2. The dispenser of claim 1, further comprising a frame, said frame comprising a width of about seventeen (17) to about twenty-five (25) inches and a length of about twenty-four (24) to about forty (40) inches.

3. The dispenser of claim 1, wherein said dispenser dispenses a plurality of frozen carbonated beverages.

4. The dispenser of claim 1, wherein said dispenser dispenses a plurality of frozen noncarbonated beverages.

5. The dispenser of claim 1, wherein said dispenser dispenses a plurality of partially frozen products.

6. The dispenser of claim 1, wherein said product delivery system comprises a plurality of product sources, said plurality of product sources in communication with said three pressurized product barrels via a plurality of product pumps.

7. The dispenser of claim 6, wherein said product delivery system comprises a water source, said water source in communication with said three pressurized product barrels via a water pump.

8. The dispenser of claim 7, wherein said product delivery system comprises a gas source, said gas source in communication with said three pressurized product barrels via a regulator.

9. The dispenser of claim 8, wherein said product delivery system comprises a plurality of expansion chambers in communication with said three pressurized product barrels so as to accept product from said product sources, water from said water source, and gas from said gas source.

10. The dispenser of claim 1, wherein each of said three pressurized product barrels comprises a scrapper blade positioned for rotation therein.

11. The dispenser of claim 1, wherein said product delivery system comprises a nozzle in communication with said three pressurized product barrels.

12. The dispenser of claim 1, wherein said refrigeration system comprises a plurality of evaporators in communication with said compressor.

13. The dispenser of claim 12, wherein said plurality of evaporators comprises a plurality of evaporator lines encircling said three pressurized product barrels.

14. The dispenser of claim 12, wherein said plurality of evaporators comprises a plurality of evaporator lines encircling said three pressurized product barrels via a shrink fit.

15. The dispenser of claim 1, wherein said compressor comprises about 150 to 250 duty cycles per day.

16. The dispenser of claim 1, further comprising a control circuit for operation of said product delivery system and said refrigeration system.

17. A dispenser for a providing a plurality of frozen products from a plurality of product sources with product therein, said dispenser consisting of:
   three product barrels in communication with said plurality of product sources;
   one compressor; and
   a plurality of refrigerant lines in communication with said one compressor; aid plurality of refrigerant lines encircling said three product barrels so as to freeze said product therein such that each of said three product barrels produce one of the plurality of frozen products on demand.

18. A method of providing a plurality of frozen beverages, comprising the steps of
   providing three product sources;
   providing a water source;
   mixing said three products and said water to form three beverages;
   delivering said three beverages to three product barrels;
   freezing said three beverages within said three product barrels by operating one compressor; and
   dispensing three frozen beverages and up to two blends of said beverages on demand.

19. The method of claim 18, further comprising the steps of providing a gas source and mixing said three products, said water, and said gas.

20. The method of claim 18, wherein said plurality of frozen beverages comprises carbonated and noncarbonated beverages.

* * * * *

UNITED STATES PATENT AND TRADEMARK OFFICE
CERTIFICATE OF CORRECTION

PATENT NO.    : 6,604,654 B2
DATED         : August 12, 2003
INVENTOR(S)   : Richard Carroll Staten and Douglas John Franck It is certified that error appears in the above-identified patent and that said Letters Patent is hereby corrected as shown below:

<u>Column 2,</u>
Line 2, please add -- in -- after "be" and before "communication".

<u>Column 7,</u>
Line 13, please delete "aid" and replace with -- said --.

Signed and Sealed this

Eleventh Day of November, 2003

JAMES E. ROGAN
*Director of the United States Patent and Trademark Office*